United States Patent [19]

Hall, Jr. et al.

[11] 4,439,597

[45] * Mar. 27, 1984

[54] PROCESS FOR THE PREPARATION OF POLYBUTYLENE TEREPHTHALATE

[75] Inventors: Henry K. Hall, Jr.; Anne B. Padias, both of Tucson, Ariz.

[73] Assignee: Celanese Corporation, New York, N.Y.

[ * ] Notice: The portion of the term of this patent subsequent to Aug. 24, 1999 has been disclaimed.

[21] Appl. No.: 369,065

[22] Filed: Apr. 16, 1982

Related U.S. Application Data

[63] Continuation-in-part of Ser. No. 181,275, Aug. 25, 1980, Pat. No. 4,346,213.

[51] Int. Cl.³ ............................................. C08G 63/34
[52] U.S. Cl. .................................... 528/272; 528/274; 528/275
[58] Field of Search ........................................ 528/272

[56] References Cited

U.S. PATENT DOCUMENTS 4,329,444  5/1982  Borman ................................. 528/272
4,346,213  8/1982  Hall et al. ............................. 528/272

*Primary Examiner*—Theodore Morris
*Attorney, Agent, or Firm*—Scully, Scott, Murphy & Presser

[57] ABSTRACT

In the two stage reaction of terephthalic acid with 1,4-butanediol to produce polybutylene terephthalate in which acid and diol are first subjected to catalytic esterification/oligomerization and the resulting products are thereafter subjected to catalytic polycondensation, the co-production of tetrahydrofuran is significantly reduced by conducting the polycondensation reaction prior to completion of the esterification/oligomerization reaction.

2 Claims, No Drawings

PROCESS FOR THE PREPARATION OF POLYBUTYLENE TEREPHTHALATE

CROSS-REFERENCE TO RELATED APPLICATION

This application is a continuation-in-part of application Ser. No. 181,275, filed Aug. 25, 1980 now U.S. Pat. No. 4,346,213.

BACKGROUND OF THE INVENTION

1. Field of the Invention

This invention relates to the field of polyesters and, more particularly, to processes for preparing polybutylene terephthalate by direct esterification of terephthalic acid and 1,4-butanediol.

2. Description of the Prior Art

One route to the synthesis of polybutylene terephthalate involves carrying out the direct catalytic esterification of terephthalic acid and 1,4-butanediol in two distinct stages: in the first stage, terephthalic acid and 1,4-butanediol are reacted in the presence of catalyst to form bis-hydroxybutyl terephthalate and oligomers thereof and in the second stage, the bis-hydroxybutyl terephthalate and the oligomers undergo polycondensation in the presence of catalyst to provide product polybutylene terephthalate. The first stage is considered at an end when the reaction medium becomes homogeneous, i.e., when the "clearing point" indicating the conversion of substantially all the terephthalic acid (which is highly insoluble in the reaction medium) has been reached. In conventional practice, the second stage is commenced (by increasing the temperature and applying a vacuum) only after the clearing point of the first stage reaction has occurred. Versions of the polyesterification procedure are disclosed in U.S. Pat. Nos. 3,050,533 and 3,185,668. Such a synthesis of polybutylene terephthalate, desirable as it may be in providing a direct route to this commercially important resin, is subject to the major disadvantage that terephthalic acid acts as a catalyst for the conversion of 1,4-butanediol to tetrahydrofuran thereby reducing yield and increasing the production cost of the resin. It has been proposed in U.S. Pat. No. 3,936,421 to minimize tetrahydrofuran production by esterifying terephthalic acid with 1,4-butanediol in the presence of a mixture of an organotin compound and an organotitanium compound as catalyst. Another proposal to minimize tetrahydrofuran production is made in U.S. Pat. No. 4,014,858 which teaches the use of a tetravalent tin catalyst having one organo-to-tin linkage.

Because of the foregoing disadvantage associated with the direct esterification method, the principal process of manufacturing polybutylene terephthalate remains the transesterification of a dialkyl terephthalate, generally dimethyl terephthalate, with 1,4-butanediol since less tetrahydrofuran is encountered in this procedure. However, transesterification remains an indirect route to polybutylene terephthalate and were it not for the fact that the direct synthesis approach produces unacceptably large quantities of tetrahydrofuran, the latter would clearly be the process of choice.

SUMMARY OF THE INVENTION

It has now been discovered that with suitable timing of the sequence of reactions in the two-stage direct catalytic esterification of terephthalic acid and 1,4-butanediol to provide polybutylene terephthalate, the synthesis of this polyester can be carried out in an otherwise conventional manner but with minimal co-production of tetrahydrofuran. In contrast to the usual case where the second stage polycondensation reaction is begun only after the clearing point of the first stage esterification/oligomerization reaction has been reached, it is a critical feature of the present invention to commence polycondensation before reaching the clearing point.

Thus, in accordance with the present invention, in the process for preparing polybutylene terephthalate in which terephthalic acid and 1,4-butanediol are reacted in a first stage at an elevated temperature in the presence of catalyst until the clearing point of the reaction is reached, and the reaction products of the aforesaid first stage are further reacted in a second stage at a temperature which is higher than that of the first stage and at substantially less than superatmospheric pressure to distill 1,4-butanediol, in the presence of catalyst to provide polybutylene terephthalate, the improvement is provided which comprises commencing the second stage reaction after a major part of the terephthalic acid has been consumed in the first stage but before the clearing point of the first stage reaction has been reached.

DESCRIPTION OF THE PREFERRED EMBODIMENTS

The term "polybutylene terephthalate" as used herein contemplates substantially linear polyesters comprised of units derived from terephthalic acid and 1,4-butanediol. The aforesaid term also includes copolyesters in which up to 40 mole percent of the terephthalic acid is replaced with one or more other copolycondensable polycarboxylic acids and/or up to 40 mole percent of the 1,4-butanediol is replaced with one or more other copolycondensable polyols. Examples of other copolycondensable polycarboxylic acids include isophthalic acid, adipic acid, sebacic acid, azelaic acid, dodecane dicarboxylic acid, hexahydroterephthalic acid, phenylindanedicarboxylic acid, trimellitic acid, trimesic acid and 2,6-naphthalenedicarboxylic acid. Examples of other copolycondensable polyols include ethylene glycol, 1,3-propylene glycol, neopentyl glycol, pentaerythritol and 1,6-hexanediol.

Any of the catalysts heretofore employed in polyesterification processes can be used herein with good results. Especially preferred are the known and conventional organotitanium and organotin polyesterification catalysts used singly or in admixture. Illustrative of useful organotitanium catalysts are titanium tetrabutoxide, tetramethyl titanate, ethylene glycol titanate, tetrabutylene glycol titanate, tetrabutyl titanate, tetraisopropyl titanate, tetra(2-ethylhexyl)titanate, tetraoctyl titanate and tetrastearyl titanate and partially or completely hydrolyzed and transesterified products of the foregoing. Examples of organotin catalysts which are advantageously used herein include tetraethyl tin, triethyltin hydroxide, triphenyltin hydroxide, triisobutyltin acetate, dibutyltin diacetate, tributyltin acetate, diphenyltin dilaurate, monobutyltin trichloride, dibutyltin dichloride, tributyltin chloride, methylphenyltin oxide, dibutyltin oxide, didodecyltin oxide, dibutyltin sulfide and butylhydroxy tin oxide. Of the foregoing, titanium tetrabutoxide and tributyltin acetate are particularly preferred.

The amounts of catalysts used herein can vary over wide limits with from 0.005 to 0.5 percent by weight, and preferably, from 0.01 to 0.1 weight percent of catalyst based on the weight of the resulting polyester being entirely sufficient in most cases.

In the first stage reaction of 1,4-butanediol and terephthalic acid, the molar ratio of diol to acid is advantageously within the range of from about 1.2:1 to about 2.0:1. While the process herein contemplates conventional conditions for the first stage esterification/oligomerization reaction, e.g., temperatures of about 150° C. to about 230° C. at about atmospheric or slightly subatmospheric pressure while water and minor amounts of tetrahydrofuran are being distilled from the reaction medium, it is especially beneficial to reducing the amount of tetrahydrofuran produced to conduct the first stage reaction at a temperature of from about 205° C. to about 215° C. and preferably, at a temperature of from about 208° C. to about 212° C. Within this restricted range of preferred temperature, a 1,4-butanediol to terephthalic acid ratio of from about 1.5:1 to about 1.8:1 provides especially good results. The advantage to employing such a temperature range for the first stage is shown in the data in Table I below:

TABLE I

Effect of the temperature on the production of tetrahydrofuran (THF) during the first stage esterificaiton/oligomerization of 1,4-butanediol (BD) and terephthalic acid (TA)

| Temperature (C.°) | Time (hr min) | moles H$_2$O formed | moles THF formed | moles ester-bond formed | moles-COOH left over | % conversion | % BD → THF |
|---|---|---|---|---|---|---|---|
| 190° | 6 hr | 0.27 | 0.020 | 0.25 | 0.15 | 62 | 3 |
| 200° | 6 hr | 0.31 | 0.035 | 0.28 | 0.12 | 70 | 6 |
| 210° | 1 hr 10 min | 0.42 | 0.03 | 0.4 | 0 | 100 | 5 |
| 220° | 50 min | 0.48 | 0.09 | 0.4 | 0 | 100 | 15 |

Starting concentration:
TA = 0.2 mole
BD = 0.6 mole
Ti (OBu)$_4$ = 2 mole % versus TA

TABLE II

Production of tetrahydrofuran when first stage reaction is carried to completion (clearing point reached)

| TA/BD | Clearing Time reached | Moles of H$_2$O formed | Moles of THF formed | after 4 hours Total % esterification | % BD → THF |
|---|---|---|---|---|---|
| 1/3 | 1 hr 20 | 0.51 | 0.10 | 100 | 12 |
| 1/2.5 | 1 hr 40 | 0.48 | 0.08 | 100 | 16 |
| 1/2 | 1 hr 45 | 0.44 | 0.03 | 100 | 8 |
| 1/1.7 | 2 hr 30 | 0.42 | 0.02 | 100 | 6 |

If, however, at a time prior to the clearing point of the reaction, which is readily determined for a given reaction medium and reaction conditions employing simple and routine testing, the conditions for the second stage polycondensation, i.e., increased reaction temperature and vacuum, are applied to the reaction medium, the amounts of 1,4-butanediol converted to tetrahydrofuran will be substantially reduced (Table III, infra). For example, the reaction conditions proper to the second stage polycondensation reaction can be applied when from about 10 weight percent to about 40 weight percent, and advantageously from about 20 weight percent to about 30 weight percent, of unreacted terephthalic acid remains in the first stage reaction medium. Such reaction conditions include temperatures of from about 225° C. to about 270° C., preferably from about 235° C. to 250° C., and reduced pressures of less than 100 mm Hg, and preferably less than 75 mm Hg.

As stated above, it is essential to the process of the invention herein to commence the second stage polycondensation reaction before the clearing point of the first stage esterification/oligomerization reaction has been reached. In general, the clearing point of the first stage reaction can be considered to be reached when substantially all the terephthalic acid and 1,4-butanediol have reacted to provide bishydroxybutyl terephthalate which is soluble in the reaction medium. The percentage amounts of 1,4-butanediol converted to tetrahydrofuran in known and conventional processes which commence polycondensation only upon reaching the clearing point are given in the data set forth in Table II as follows:

EXAMPLES 1-10

To demonstrate the significant advantage of carrying out the polycondensation reaction herein prior to reaching the clearing point in the first stage reaction, a series of polymerizations were run with different catalyst levels at a terephthalic acid/1,4-butanediol ratio of 1/1.7. The first stage reactions in each polymerization were carried out at 210° C. After the periods indicated, a vacuum (about 60 mm Hg) was applied in some runs and the temperature was raised to 235° C. The reaction apparatus was connected to a distilling apparatus and a series of traps cooled with liquid nitrogen. In the flask of the distilling apparatus, 1,4-butanediol was collected, and the traps contained water and tetrahydrofuran. The results of the polymerization runs are summarized in Table III below:

TABLE III

Effect of commencing condensation before reaching the clearing point on production of tetrahydrofuran (TA/BD = 1/1.7, catalyst Bu$_3$SnOAc, starting temperature 210° C.)

| Examples | mole % Bu$_3$SnOAc versus TA | Vacuum and 235° C. after | clearing time | % BD → THF at clearing time | melting point of polymer |
|---|---|---|---|---|---|
| 1 | 1.5 | no | 1 hr 15 min | 4 | |
| 2 | 1.5 | 30 min | no | | |
| 3 | 1.5 | 40 min | no | | |
| 4 | 1.5 | 50 min | 1 hr 15 min | 4 | 228° C. |
| 5 | 1 | no | 1 hr 35 min | 4 | |
| 6 | 1 | 1 hr | no | | |
| 7 | 1 | 1 hr 10 min | 1 hr 35 min | 4 | 226° C. |
| 8 | 0.5 | no | 2 hr 30 min | 6 | |
| 9 | 0.5 | 2 hrs | 2 hr 35 min | 6 | 224° C. |
| 10 | 0.1* | 1 hr 15 min | 1 hr 25 min | 4 | |

*0.1 mole % titanium tetrabutoxide co-catalyst present.

As these data demonstrate, substantially less tetrahydrofuran is produced in Examples 4, 7 and 9 than that which is provided by the conventional method of applying vacuum and increased temperature only after the clearing point has been reached. Examples 1, 5 and 8 demonstrate the criticality of employing a vacuum and increased temperature for the polycondensation reaction as the absence of these conditions will result in a failure to obtain an acceptable polymer. Examples 2, 3 and 6 show that for the particular reaction media therein the periods at which polycondensation conditions were applied were too early to provide an acceptable polymer thus demonstrating the need for experimentally determining the optimum time for commencing the second stage reaction for a given case.

While the procedures herein which are exemplary of the process of this invention illustrate batch polymerization, it will be readily appreciated by those skilled in the art that the process of the invention is equally applicable with conventional modification to continuous polymerization as well.

What is claimed is:

1. In the process for preparing polybutylene terephthalate in which terephthalic acid and 1,4-butanediol are reacted in a first stage at elevated temperature in the presence of polyesterification catalyst until the clearing point of the reaction is reached, and the reaction products of the aforesaid first stage are further reacted in a second stage at a temperature which is higher than that of the first stage and at substantially less than superatmospheric pressure to distill 1,4-butanediol, in the presence of a polycondensation catalyst to provide polybutylene terephthalate, the improvement is provided which comprises commencing the second stage reaction after a major part of the terephthalic acid has been consumed in the first stage but before the clearing point of the first stage reaction has been reached and when from about 10 weight percent to about 40 weight percent unreacted terephthalic acid remains in the first stage reaction medium.

2. In the process for preparing polybutylene terephthalate in which terephthalic acid and 1,4-butanediol are reacted in a first stage at elevated temperature in the presence of polyesterification catalyst until the clearing point of the reaction is reached, and the reaction products of the aforesaid first stage are further reacted in a second stage at a temperature which is higher than that of the first stage and at substantially less than superatmospheric pressure to distill 1,4-butanediol, in the presence of polycondensation catalyst to provide polybutylene terephthalate, the improvement is provided which comprises commencing the second stage reaction after a major part of the terephthalic acid has been consumed in the first stage but before the clearing point of the first stage reaction has been reached and when from about 20 weight percent to about 30 weight percent unreacted terephthalic acid remains in the first stage reaction medium.

* * * * *